United States Patent

Stutz

[15] 3,649,065
[45] Mar. 14, 1972

[54] CAMPER ANCHORING DEVICE

[72] Inventor: Herbert D. Stutz, 3424 Valley View Drive, Elkhart, Ind. 46514

[22] Filed: Dec. 30, 1969

[21] Appl. No.: 889,219

Related U.S. Application Data

[63] Continuation-in-part of Ser. No. 667,139, Sept. 12, 1967, abandoned, which is a continuation-in-part of Ser. No. 563,478, July 7, 1966, Pat. No. 3,356,408.

[52] U.S. Cl. ..........................................296/23 MC, 248/361
[51] Int. Cl. ..............................................B60p 3/32
[58] Field of Search ...................296/35.1, 23 MC; 248/361; 250/174

[56] References Cited

UNITED STATES PATENTS 3,454,253   7/1969   Lippiatt ............................296/23 MC
3,540,772   11/1970  Weller .............................296/23 MC

*Primary Examiner*—Philip Goodman
*Attorney*—Marmaduke A. Hobbs and Kemon, Palmer, Stewart & Estabrook

[57] ABSTRACT

A device for anchoring a camper to the bed of a pickup truck consisting of a fixture secured to the bed along the inside of and projecting outwardly from the top of the bed side and having a post extending vertically downwardly inside the bed. A fixture is attached to the lower end of the post for engaging either the bottom or side of the bed. A turnbuckle construction is used to attach the fixture to the camper and to secure the camper firmly in place on the truck bed.

4 Claims, 15 Drawing Figures

Patented March 14, 1972
3,649,065
4 Sheets-Sheet 1
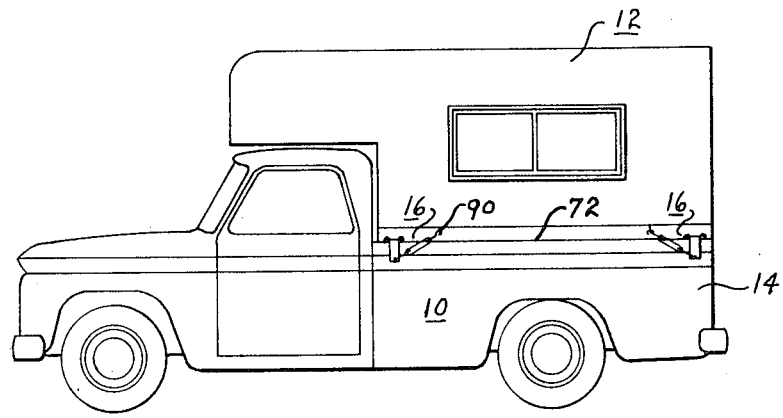
FIG. 1
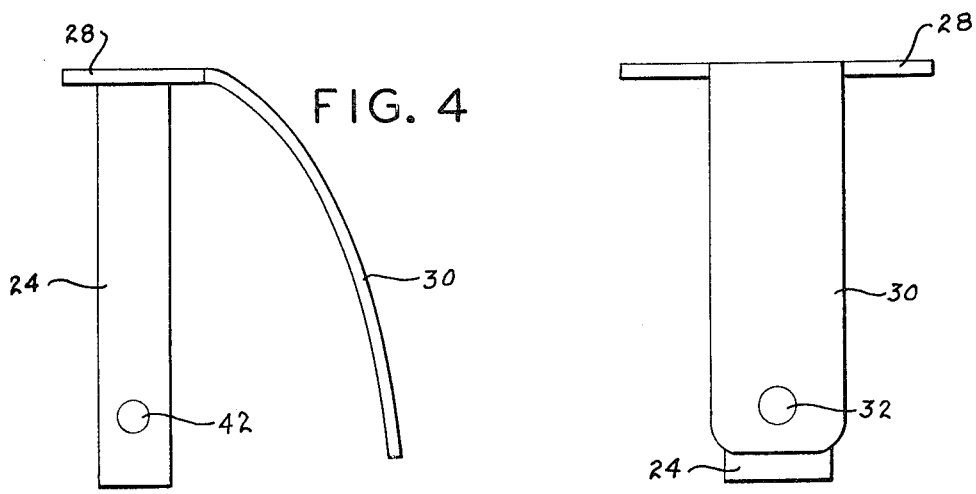
FIG. 4
FIG. 3
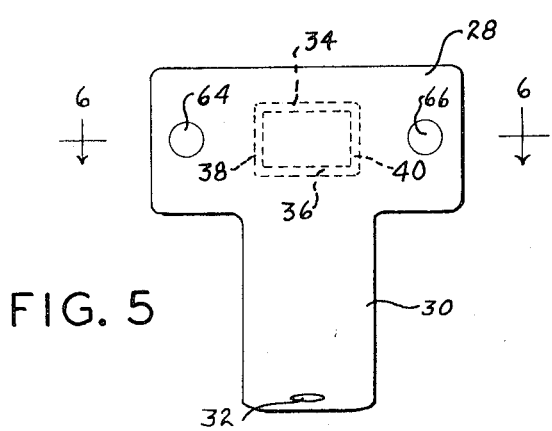
FIG. 5
INVENTOR.
HERBERT D. STUTZ Patented March 14, 1972  3,649,065

INVENTOR.
HERBERT D. STUTZ

Patented March 14, 1972
3,649,065
4 Sheets-Sheet 3
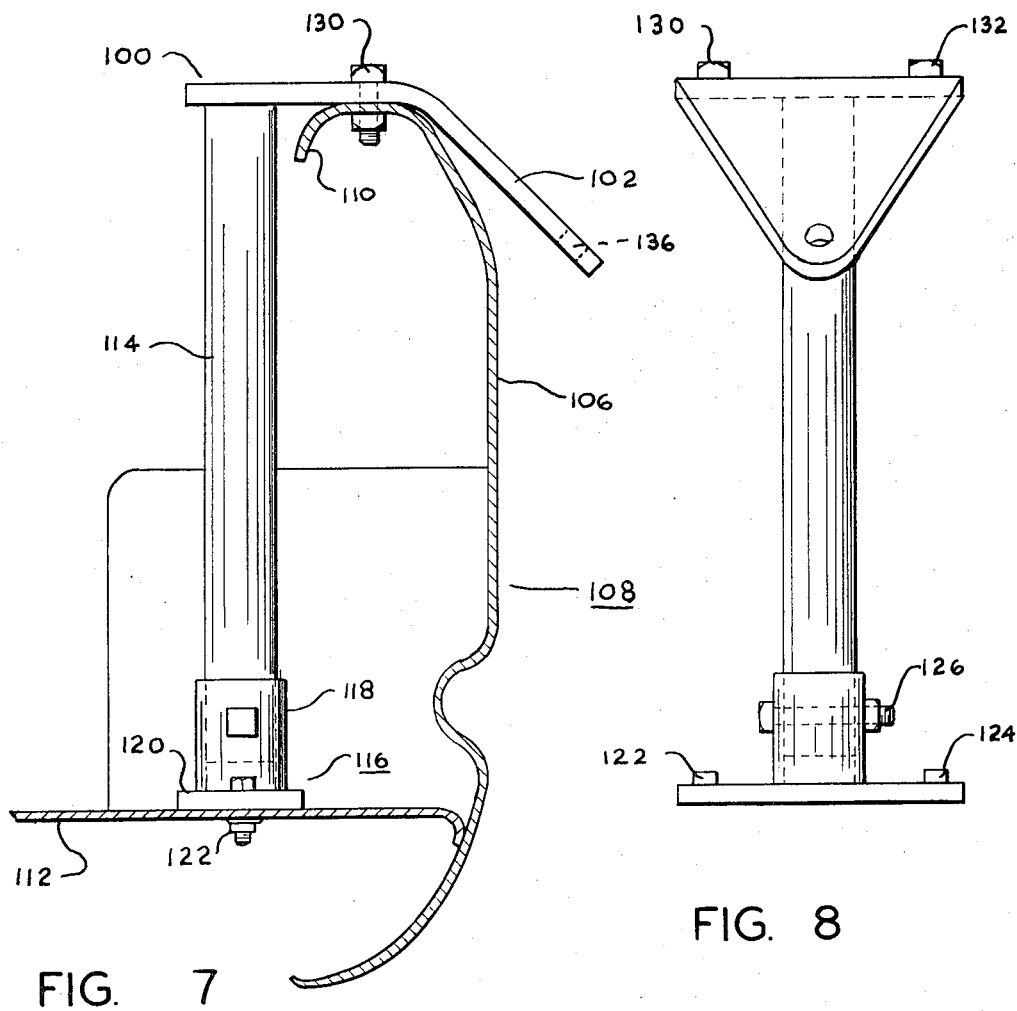
FIG. 7
FIG. 8
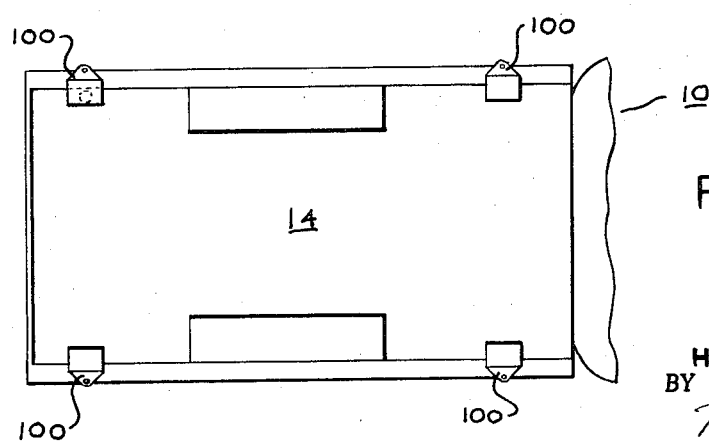
FIG. 9
INVENTOR.
HERBERT D. STUTZ
BY M. A. Hobbs
ATTORNEY Patented March 14, 1972

INVENTOR.
HERBERT D. STUTZ
BY *M. A. Hobbs*
ATTORNEY

CAMPER ANCHORING DEVICE

This application is a continuation-in-part of my copending application Ser. No. 667,139, now abandoned, filed Sept. 12, 1967, which is in turn a continuation-in-part of application Ser. No. 563,478 filed July 7, 1966, now U.S. Pat. No. 3,356,408.

In recent years, pickup campers have become popular and appear on the market in a variety of different shapes, models and designs. These units are lifted onto the truck bed and anchored to the truck by tie rods or wires or other securing means attached either to the truck bed or to the body of the truck. Anchoring the campers has been a difficult problem, in that tie rods or wires extend over the sides of the truck bed to the lower edge of the truck body, and hence are conspicuous and unsightly, or brackets or fixtures are attached to the bed in locations difficult to reach in mounting the camper on and removing it from the truck, requiring special mountings on and holes in the truck bed or body. Further, some of the fixtures of the more inconspicuous types do not anchor the camper securely, and hence are unsafe while the truck is being driven with the camper, or while the camper is being used on the truck bed. It is therefore one of the principal objects of the present invention to provide a device for anchoring a camper in the bed of a pickup truck, which can be effectively and securely attached to the truck bed without any substantial alteration in the bed and which dependably holds the camper firmly in place on the truck yet permits it to be readily removed therefrom and the truck used in the normal manner without interference from the attached device.

Another object is to provide an anchoring device for a pickup camper which utilizes the conventional fixtures on the truck bed used for sideboards, top or super-structure, and which is relatively small and is inconspicuous on the truck when securing the camper in place.

Still another object of the invention is to provide an anchoring device for securing a camper on a pickup truck which is so secured to the truck and camper that it can be easily and conveniently reached to secure the device to the bed and the camper, and which can be readily connected to various makes and models of pickup trucks without making any changes in the construction and design of the device, or in the truck bed aside from several inconspicuous holes in inner flanges of the bed sides.

A further object is to provide a relatively simple, easily fabricated anchoring device of the aforesaid type which requires only one design and construction for securing both the front and the rear of the camper in the truck bed, and which can be easily assembled and installed with the use of only a relatively few separate parts.

Additional objects and advantages of the invention will become apparent from the following description and accompanying drawings, wherein:

FIG. 1 is a side elevational view of a pickup truck with a camper mounted thereon and secured in place by the present camper anchoring device;

FIG. 3 is a front elevational view of one part of the anchoring device;

FIG. 4 is a side elevational view of the part shown in FIG. 3;

FIG. 5 is a top plan view of the part shown in FIGS. 3 and 4;

FIG. 7 is a side elevational view of a modified form of the present anchoring device showing it mounted on and secured to a pickup truck bed, the truck bed being shown merely in outline;

FIG. 8 is a front elevational view of the modified form of the device shown in FIG. 7;

FIG. 9 is a schematic top plan view of a truck bed showing the embodiment of FIGS. 7 and 8 of the present anchoring device mounted thereon;

Figure 10:
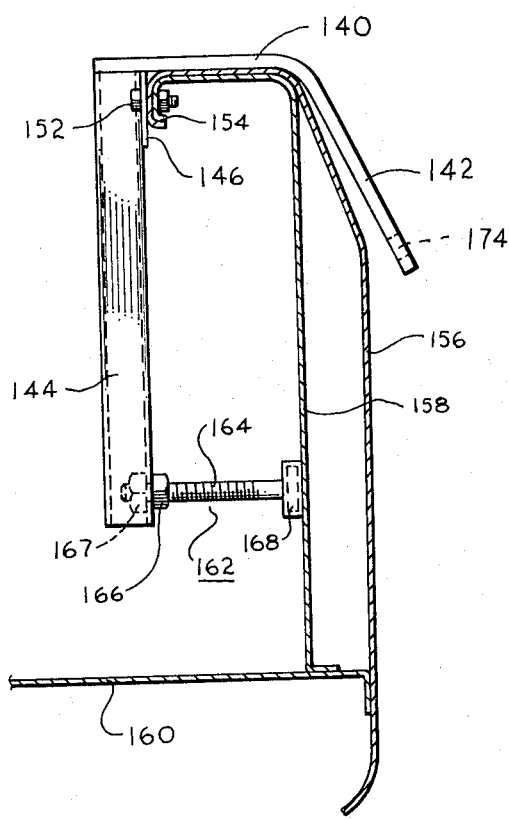
Figure 11:
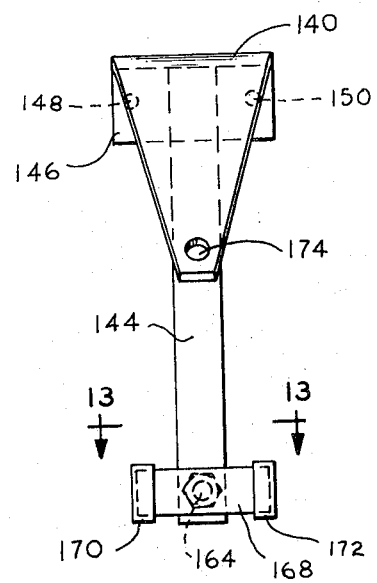
Figure 13:
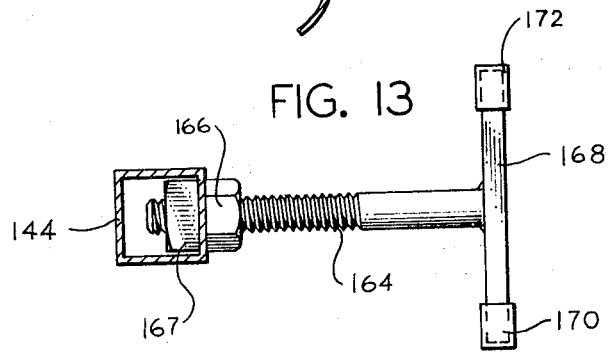
Figure 12:
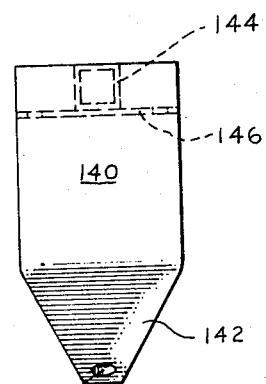

FIGS. 10, 11, and 12 are side and front elevational and top plan views, respectively, of another modified form, FIG. 10 showing the modified form mounted on a truck bed;

FIG. 13 is a cross sectional view taken on line 13—13 of FIG. 11; and

Figure 14:
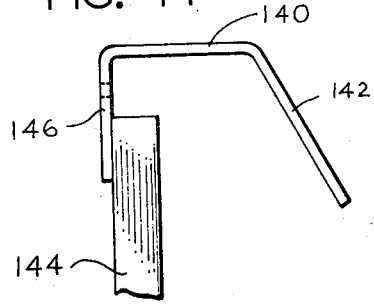
Figure 15:
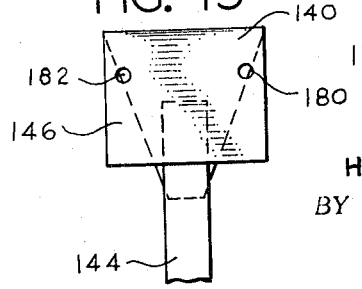

FIGS. 14 and 15 are schematic elevational views of a still further modified form of the present camper anchoring device.

Referring more specifically to the drawings, and to FIG. 1 in particular, numeral 10 designates a pickup truck and 12 a camper mounted on the bed 14 of the truck and secured in place by a plurality of the present camper anchoring devices indicated by numeral 16. The present device can be used satisfactorily with various makes and models of pickup trucks, and with various makes and models of campers, the one shown being merely for the purpose of illustrating the manner in which the present camper anchoring device is used.

The present camper anchoring device consists of an anchor base portion 20 and a tiedown arm 22, the base portion consisting of a post 24, preferably of a rectangular cross section and having external measurements substantially the same size as the opening in the fixture 26 of the pickup truck bed 14. Secured to the upper edge of the base portion is a cross member 28, having an arm 30 joined integrally thereto and extending downwardly in spaced relation to post 24. Arm 30 is provided with a hole 32 for receiving one end of arm 22. The base portion is constructed of metal, and cross member 28 is welded or otherwise rigidly secured to the upper end of post 24. The post is formed by sidewalls 34 and 36 and endwalls 38 and 40, and the two endwalls are provided with holes 42 and 44, respectively, for receiving a pin 46 or bolt for retaining the post in fixture 26. As shown in the drawings, a pin is used in retaining the post in the fixture and a cotter pin or key 48 extends through a hole 50 in the end of the pin to lock the pin in the fixture, the fixture being provided with a pair of holes 52 and 54 for receiving the pin. The anchor base portion is preferably also secured rigidly in place by bolts 60 and 62 extending downwardly through holes 64 and 66 in cross member 28 and holes 68 and 70 in the upper edge 72 of the bed of the pickup truck and retained in place by nuts 74 and 76. Normally, the two holes 68 and 70 are drilled in the upper edge of the bed when the installation is initially made; however, the holes 52 and 54 are provided initially in the fixture for use in retaining posts or bars projecting upwardly for sideboards, a top or other superstructure on the pickup truck bed. Arm 22 consists of members 80 and 82 having hooked ends 84 and 86, respectively, the members being threaded into opposite ends of turnbuckle 88. Hooked end 84 engages arm 30 of the base member by extending through hole 32, and hooked end 86 engages an eye 90 in the side of the pickup camper.

Figure 6:
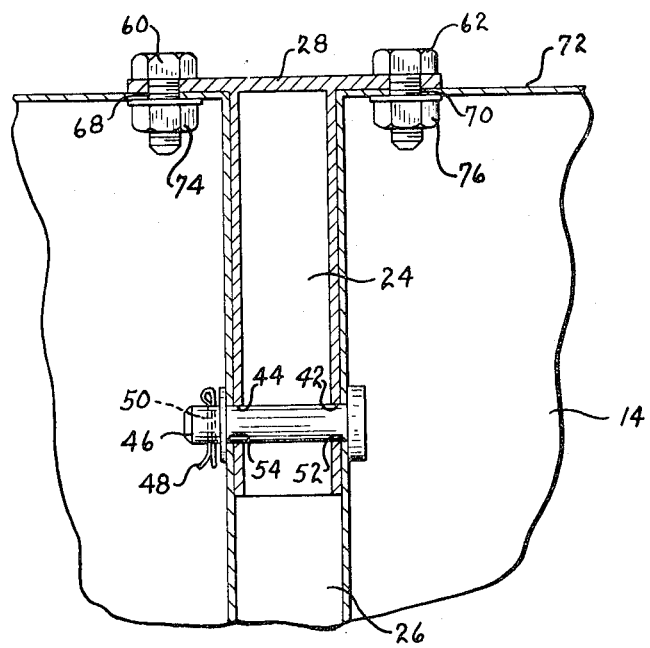
FIG. 6 is an enlarged, fragmentary vertical cross sectional view of the present device mounted in a fixture on the pickup truck, the section of the device being taken on line 6—6 of FIG. 5.
Figure 2:
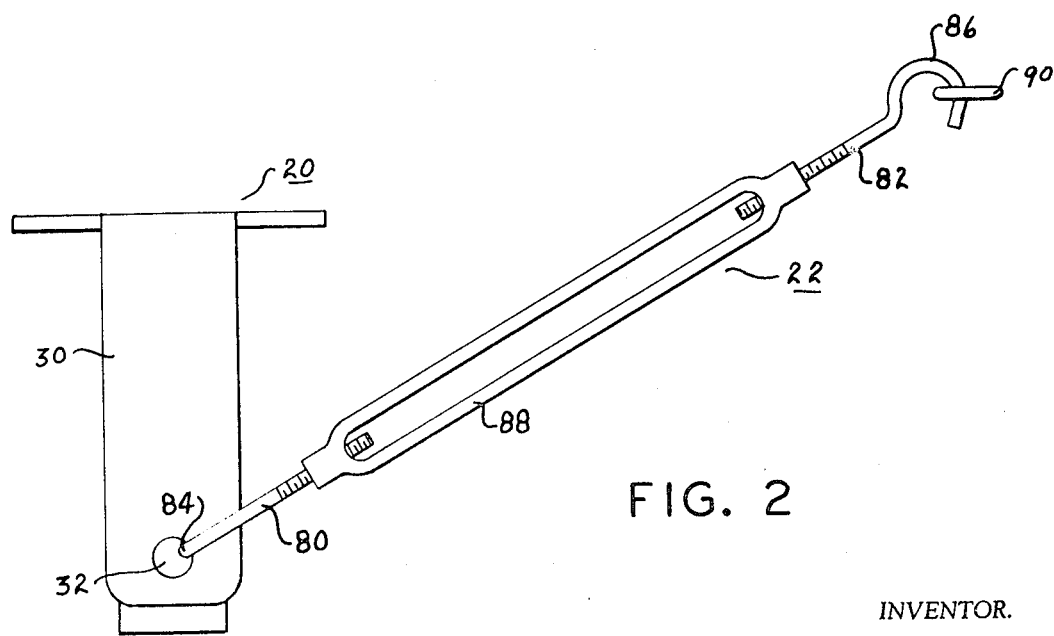
FIG. 2 is an enlarged front elevational view of the present camper anchoring device.

In installing the present camper anchoring device on a pickup truck having four fixtures 26, post 24 of each anchoring device is slipped downwardly into the respective fixtures 26 and pins 46 are placed through the fixtures and posts. Bolts 60 and 62 are then secured in place and arm 22 is connected to arm 30 in the manner illustrated in FIGS. 1 and 2 with hooked end 84 extending through hole 32 and hooked end 86 extending through eye 90 secured to the side of the camper.

After the anchoring devices have been assembled in the fixtures 26 in the foregoing manner, the camper is then placed on the truck bed in the position illustrated in FIG. 1, arms 22 are installed and each turnbuckle 88 is rotated to tighten the device and secure the camper firmly in place on the bed where it will remain until the anchoring device is released by releasing the turnbuckle.

Arm 30 is preferably made of spring steel so that it will spring slightly when the turnbuckle is tightened and thereby firmly retain the camper in place regardless of vibrations, jostling, or road jarring. In some installations the post may be eliminated and member 28 secured directly to the upper edge of the bed side by bolts or other suitable securing means.

The modified form of the device shown in FIGS. 7 and 8 consists of a body portion 100 having an outwardly extending arm 102 secured rigidly to the body and projecting downwardly along the outside surface of the side 106 of truck body 108, the truck body being shown merely in outline and having in addition to side 106 an inwardly extending flange 110 and bottom 112. Body 100 is mounted on the upper end of post 114 and rigidly secured thereto, by welding or other suitable securing means. The post seats in a support member 116 consisting of an upwardly extending socket 118 seated on and rigidly secured to a base plate 120, which in turn is secured to the bottom of the truck by two bolts 122 and 124. The socket is a cylindrical member with an open top and receives the lower end of post 114, and the lower end of the post is secured in the socket by a bolt 126 extending through the sidewall of the socket and through the lower end of the post. The proper location for bolt 126 to give the height required to post 114 to permit body 100 to seat on the upper surface of inwardly extending flange 110 is obtained by drilling a hole through the lower end of the post for bolt 126 after the device has been assembled in place. The upper end of the anchor is secured to flange 110 by two bolts 130 and 132, extending downwardly through the body and through flange 110.

When the modified form of the device has been mounted in place in the manner shown in FIG. 7, it is capable of holding the camper rigidly in place in the bed without relying primarily on the sides of the bed. The attachment of the device to the bottom of the truck gives substantial rigidity and dependability to the device to withstand all normal uses of the truck and camper. The modified form can be readily installed by merely drilling the four holes, two in the bottom and two in flange 110 for the respective bolts, and can be easily removed from the truck, if desired, by merely removing the bolts, thus leaving only the four holes permanently in the truck bed. Since the hole for bolt 126 is drilled during installation to provide the required length in post 114, the present anchoring device can be adapted to various truck beds for effective and dependable securing action by the anchor. The arm 22 is connected to arm 102 by hooked end 84 extending through hole 136. The modified anchor is used in the same manner as the previous embodiment, along with arm 22, to secure the camper rigidly in place.

A still further modified form of the present camper anchoring device is illustrated in FIGS. 10, 11, 12 and 13. This embodiment of the invention consists of a body portion 140 having a generally triangular shaped protruding part 142 extending outwardly and downwardly from the truck bed over the top of one of the sides. Rigidly joined to the underside of body 140 near the inner edge thereof is a post 144 of a square horizontal cross sectional configuration, extending downwardly on the inside of the truck side in spaced relation thereto. A plate 146 is secured by welding or other suitable means to the side of post 144 facing the sidewall, and contains holes 148 and 150 for receiving bolts 152 which extend through holes 148 and 150 and through corresponding holes in an inner flange 154 on the upper inner edge of the truck sidewall. In the truck shown, the sidewalls of the bed consist of an outer panel 156 and an inner wall panel 158 and a bottom 160 connected to the lower ends of the two panels by welding or other suitable securing means. The post is held in a vertical position by a fixture 162 consisting of a threaded shaft or stud 164 extending through a hole in the wall of post 144 near the bottom thereof. Nuts 166 and 167 on the outside and inner side of the hollow post rigidly hold the stud in its laterally extending position as illustrated in the drawings. Secured to the outer end of the stud is a plate or head 168 which bears against the inner panel 158 of the truck bed sidewall.

The force applied to body 140 when the camper is secured in place on the truck bed is generally upward, and the post tends to pivot inwardly from a point adjacent bolts 152. Since this force is countered by fixture 162, which preferably merely seats on the bears against the adjacent side of panel 158, it is not necessary to secure the stud or head 168 to the panel. Rubber members 170 and 172 may be attached to the outer ends of head 168 to cushion the fixture on the side of panel 158. The lower end of the post may be adjusted in a lateral direction transverse to the truck body by screwing nuts 166 and 167 inwardly or outwardly on stud 164. After the adjustment has been made, the two nuts are tightened to clamp them firmly against the side wall of the square tubular post. After the anchoring device of this modified embodiment has been secured to the truck bed in the manner illustrated in FIG. 10, a turnbuckle or other suitable connecting link is attached in hole 174 and to a suitable anchoring point on the camper in the manner described hereinbefore with reference to the first embodiment of the invention.

The embodiment of the invention illustrated in the schematic views of FIGS. 14 and 15 is essentially the same as the embodiment of FIGS. 10 through 13, except that plate 146 is formed as an integral part of body 140, extending downwardly therefrom along the surface of the inner edge of flange 154. The bolt holes 180 and 182 receive bolts 152 for securing the plate 146, and hence the device, to flange 154. The post 144 is secured to the inner side of plate 146 and extends downwardly along the inner side of the sidewall, but spaced therefrom in the same manner as illustrated in FIG. 10, and fixture 162 is attached to the post in the same manner as previously described herein. The installation in the truck body is essentially the same as that of the embodiment illustrated in FIG. 10.

One of the advantages of the embodiments shown in FIGS. 10 through 15 is that the device can be firmly secured to the sidewall of the truck bed without the use of any conspicuous holes, and the post and fixture near the bottom thereof retain the post in a vertical position and permit the post to be adjusted laterally to adjust to truck bed sidewalls of various configurations and thicknesses. Only two holes are required for each fixture, and these holes are disposed along the inner side of flange 154 at the upper edge of the side wall. Four anchoring devices are installed in the manner illustrated in FIG. 9, preferably at the forward and rearward ends of each side wall of the truck bed.

While several modifications of the present anchoring device have been described in detail herein, further changes and modifications may be made without departing from the scope of the invention.

I claim:

1. An anchoring device for use with a pickup truck bed having vertical sidewalls with an inwardly and downwardly extending flange at the upper edge of the sidewalls: said anchoring device comprising a vertically positioned post, a body attached to the upper end of the post and extending laterally outwardly and downwardly from the upper end of the post, a linkage means connected to the laterally extending end of said body for connection to an anchor point on the camper, vertically positioned plate means having a plurality of horizontally spaced holes connected to said post and extending downwardly from said body along the flange, securing bolt means extending through said plate means for holding the upper end of said post rigidly along the inner edge of said flange at the upper edge of the respective sidewall, and means for supporting the lower end of the post inside the truck bed in spaced relation to the inner surface of the sidewall.

2. An anchoring device as defined in claim 1 in which said means for supporting the lower end of the post consists of a laterally extending fixture secured to the lower end of the post and adapted to engage the inner surface of the sidewall of the bed.

3. An anchoring device as defined in claim 2 in which said fixture includes a means for adjusting the length of said fixture to vary the distance between the bottom of said post and the inner surface of the sidewall.

4. An anchoring device as defined in claim 3 in which said means includes a threaded stud and a head member on one end for engaging the inner surface of the sidewall and a threaded securing means on the other end for adjustably securing the stud to the lower end of the post.

* * * * *